United States Patent
Kadota

(10) Patent No.: US 6,697,073 B1
(45) Date of Patent: Feb. 24, 2004

(54) IMAGE PROCESSING SYSTEM

(75) Inventor: Masatoshi Kadota, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/505,733

(22) Filed: Feb. 17, 2000

(30) Foreign Application Priority Data

Feb. 17, 1999 (JP) ............................................. 11-039205

(51) Int. Cl.⁷ .............................................. G06F 15/00
(52) U.S. Cl. ....................... 345/501; 345/530; 709/222; 709/226; 709/228
(58) Field of Search ................................ 345/501, 530, 345/634; 348/588, 589, 600; 382/276; 709/222, 226, 228, 229

(56) References Cited

U.S. PATENT DOCUMENTS

| | | | | |
|---|---|---|---|---|
| 5,282,265 A | * | 1/1994 | Suda et al. | 706/11 |
| 5,287,194 A | * | 2/1994 | Lobiondo | 358/296 |
| 5,548,729 A | * | 8/1996 | Akiyoshi et al. | 709/222 |
| 5,734,328 A | * | 3/1998 | Shinbori | 340/825.06 |
| 6,088,738 A | * | 7/2000 | Okada | 709/245 |

* cited by examiner

*Primary Examiner*—Matthew C. Bella
*Assistant Examiner*—Mackly Monestime
(74) *Attorney, Agent, or Firm*—Oliff & Berridge, PLC

(57) ABSTRACT

First, link names of all the USB devices, that are connected to the system at that time, are retrieved, and a port is opened for one of the link names (S10, S20). Then, a command requesting a printer, that is connected to the subject port, to transmit device ID is issued, and a model name is extracted from device ID that is received in response to the command (S30–S50). Then, a serial number is retrieved from the subject link name (S60). Then, a port name such as "BRUSB001[PR1000]", is created to include both the serial number and the model name (S70). The created port name is registered in S80, and the subject port that has been processed in S20–S80 is closed (S90).

9 Claims, 7 Drawing Sheets

| SERIAL NUMBER | LINK NAME | DATA OF CONNECTION PATHWAY TO USB DEVICE AND TYPE OF USB DEVICE | PORT NAME |
|---|---|---|---|
| 001 | BRUSB001 | | BRUSB001[PR1000] |
| 002 | BRUSB002 | | BRUSB002[PR2000] |
| 003 | BRUSB003 | | BRUSB003[PR3000] |

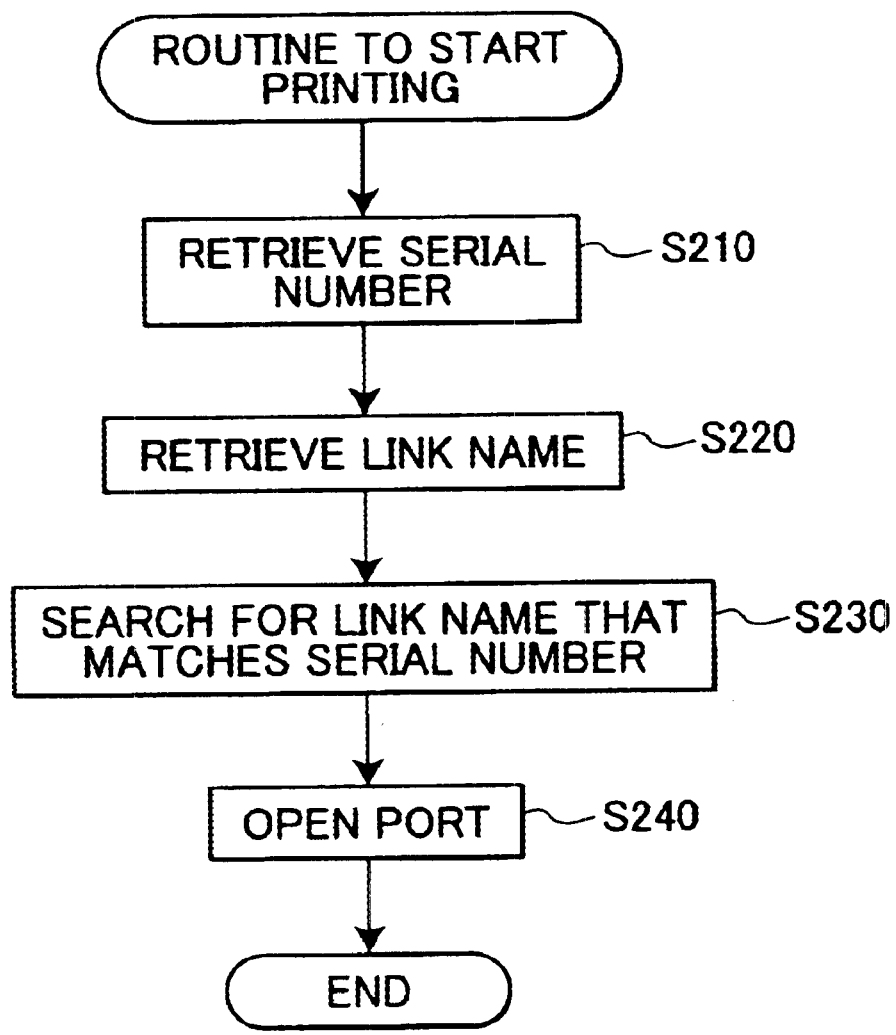

IMAGE PROCESSING SYSTEM

BACKGROUND OF THE INVENTION

1. Field of the Invention

The present invention relates to an image processing system and more particularly to an image processing system that selects one from a plurality of image processing devices, such as a plurality of printers or image scanners, and executes image processing, such as printing or image retrieval.

2. Description of Related Art

Personal computers with universal serial buses (USB) have recently started appearing in the commercial marketplace. The USB enables a personal computer to be connected to a plurality of USB compatible peripheral devices through one or more hubs. A printing system can therefore be designed by connecting a plurality of USB compatible printers to a USB personal computer through a single USB port. A desired one of the plurality of USB compatible printers can be selected and used for printing, depending on the type of printing operation to be performed.

Conventionally, when a plurality of printers are connected to a single USB port through a hub or hubs, a separate port name, such as USB 001, USB 002, USB 003, ..., is created for each printer. However, it is difficult for the user to distinguish which printer corresponds to which port name. The same problem exists in an image retrieval system that has a plurality of image scanners connected to the same USB port.

SUMMARY OF THE INVENTION

It is therefore an objective of the present invention to provide an image processing system with a plurality of image processing devices, such as printers or image scanners, connected to a computer, wherein the user can easily distinguish between the different image processing devices and select one device from the plurality of devices.

In order to attain the above and other objects, the present invention provides an image processing system, comprising: at least one image processing device; and a computer connected to the at least one image processing device, the computer including: a storage unit storing a connection path information identifying a path, along which each image processing device is connected to the computer; a request unit requesting each image processing device to transmit, to the computer, information including a distinction name discriminating between the at least one image processing device; a name extracting unit analyzing the information transmitted from each image processing device to extract the distinction name from the information; a registration unit creating, for each image processing device, a port name including a combination of the extracted distinction name and the path information stored in the storage unit, the registering unit registering the created port name for each image processing device; and a display unit displaying the port names for the at least one image processing device based on the contents registered by the registration unit, thereby enabling a user to view the port name of the at least one image processing device to select a desired image processing device among the at least one image processing device, the selected image processing device executing a desired image processing operation.

For example, the request unit may request each image processing device to transmit, to the computer, device ID that includes a model name that discriminates the each image processing device from other image processing devices.

According to another aspect, the present invention provides an image processing system applied to a computer, connected to at least one image processing device, the computer being installed with a basic software for providing: storage means for storing information on a path, along which each image processing device is connected to the computer; display means capable of displaying a port name connectable to each image processing device: list request means for requesting a port management means to list up all of at least one port name managed by the port management means; and data request means for designating one port name among the at least one port name listed up by the display means and for requesting either one of transmission and reception of data via the designated port, the image processing system including the port management means for managing at least one port for the at least one image processing device, the port management means including: information request means for requesting each image processing device to transmit, to the computer, information including distinction name discriminating the each image processing device from other image processing device; character string creating means for creating a character string discriminating the each image processing device from other image processing device based on the information transmitted from each image processing device; port name creating means for creating, for each image processing device, a port name that includes the created character string; and a port name list up means for controlling the display means to list up the port name for the at least one image processing device in response to the request by the list request means provided by the basic software.

The data request means may have a function to transmit print data, created by an application program or the like, via a user's designated port to a corresponding external printer. Or, the data request means may have another function to transfer image data, that is received via the user's designated port from a corresponding external image scanner, to an application program or the like.

The character string creating means may create a character string that indicates one path information stored in the storage means provided by the basic software. When a user selects an image processing device, desired to be used, while viewing the listed-up port names, the image processing device will be automatically selected. As long as the physical connection between each image processing device and the computer is not changed, the path information is not changed. Accordingly, the user can easily select an image processing device that is located at a certain position.

The character string creating means may include extracting means for creating the character string by extracting the distinction name from the information that is transmitted from each image processing device in response to the request. Distinction name, such as a model name of a printer or an image scanner, may be extracted from the received information. A character string, including the image processing device model name, is then created.

The computer may be provided with a universal serial bus, each image processing device being connected to the universal serial bus via a hub. USB compatible image processing devices are designed to transmit, in response to a request, a character string (device ID) that is defined according to a predetermined format as distinction information to discriminate between the respective image processing devices. The extracting means can therefore easily extract the distinction name from the information.

According to another aspect, the present invention provides a data recording medium recording a program so as to be readable by a computer connectable to at least one image processing device, the program comprising: a program requesting each image processing device to transmit, to the computer, information including a distinction name discriminating between the at least one image processing device; a program analyzing the information transmitted from each image processing device to extract the distinction name from the information; and a program creating, for each image processing device, a port name including a combination of the extracted distinction name and path information identifying a path, along which each image processing device is connected to the computer, the creating program registering the created port name for each image processing device.

According to still another aspect, the present invention provides a data recording medium recording a program so as to be readable by a computer connectable to at least one image processing devices, the computer being installed with a basic software for providing: storage means for storing information on a path, along which each image processing device is connected to the computer; display means capable of displaying a port name connectable to each image processing device; list request means for requesting port management means to list up all of at least one port name managed by the port management means; and data request means for designating one port name among the at least one port name listed up by the display means and for requesting either one of transmission and reception of data via the designated port, the program providing the port management means for managing at least one port for the at least one image processing device, the program including: a program requesting each image processing device to transmit, to the computer, information including distinction name discriminating the each image processing device from other image processing device; a program creating a character string discriminating the each image processing device from other image processing device based on the information transmitted from each image processing device; a program creating, for each image processing device, a port name that includes the created character string; and a program controlling the display means to list up the at least one port name for the at least one image processing device in response to the request by the list request means provided by the basic software.

According to a further aspect, the present invention provides an image processing system, comprising: a plurality of image processing devices; and a computer connected to the plurality of image processing devices, the computer including: a storage unit storing a connection path information identifying a path, along which each image processing device is connected to the computer; a request unit requesting each image processing device to transmit, to the computer, information including a distinction name discriminating between the plurality of image processing devices; a name extracting unit analyzing the information transmitted from each image processing device to extract the distinction name from the information; a registration unit creating, for each image processing device, a port name including a combination of the extracted distinction name and the path information stored in the storage unit, the registering unit registering the created port names for the plurality of image processing devices; and a display unit displaying the port names for the plurality of image processing devices based on the contents registered by the registration unit, thereby enabling a user to view the port names of the plurality of image processing devices to select a desired image processing device among the plurality of image processing devices, the selected image processing device executed a desired image processing operation.

According to a further aspect, the present invention provides an image processing system applied to a computer, connected to a plurality of image processing devices, the computer being installed with a basic software for providing: storage means for storing information on a path, along which each image processing device is connected to the computer; display means capable of displaying a port name connectable to each image processing device; list request means for requesting a port management means to list up all of a plurality of port names managed by the port management means; and data request means for designating one port name among the plurality of port names listed up by the display means and for requesting either one of transmission and reception of data via the designated port, the image processing system including the port management means for managing a plurality of ports for the plurality of image processing devices, the port management means including: information request means for requesting each image processing device to transmit, to the computer, information including distinction name discriminating the each image processing device from other image processing device; character string creating means for creating a character string discriminating the each image processing device from other image processing device based on the information transmitted from each image processing device; port name creating means for creating, for each image processing device, a port name that includes the created character string; and a port name list up means for controlling the display means to list up the port names for the plurality of image processing devices in response to the request by the list request means provided by the basic software.

According to another aspect, the present invention provides a data recording medium recording a program so as to be readable by a computer connectable to a plurality of image processing devices, the program comprising: a program requesting each image processing device to transmit, to the computer, information including a distinction name discriminating between the plurality of image processing devices; a program analyzing the information transmitted from each image processing device to extract the distinction name from the information; and a program creating, for each image processing device, a port name including a combination of the extracted distinction name and path information identifying a path, along which each image processing device is connected to the computer, the creating program registering the created port names for the plurality of image processing devices.

According to still another aspect, the present invention provide a data recording medium recording a program so as to be readable by a computer connectable to a plurality of image processing devices, the computer being installed with a basic software for providing: storage means for storing information on a path, along which each image processing device is connected to the computer; display means capable of displaying a port name connectable to each image processing device: list request means for requesting port management means to list up all of a plurality of port names managed by the port management means; and data request means for designating one port name among the plurality of port names listed up by the display means and for requesting either one of transmission and reception of data via the designated port, the program providing the port management means for managing a plurality of ports for the plurality of image processing devices, the program including: a program requesting each image processing device to transmit, to the computer, information including distinction name discriminating the each image processing device from other image processing device; a program creating a character string discriminating the each image processing device from other image processing device based on the information transmitted from each image processing device; a program creating, for each image processing device, a port name that includes the created character string; and a program controlling the display means to list up the port names for the plurality of image processing devices in response to the request by the list request means provided by the basic software.

BRIEF DESCRIPTION OF THE DRAWINGS

The above and other objects, features and advantages of the invention will become more apparent from reading the following description of a preferred embodiment taken in connection with the accompanying drawings in which:

FIG. 7 is a flowchart representing a routine for starting printing operations.

DETAILED DESCRIPTION OF THE PREFERRED EMBODIMENT

Figure 1:
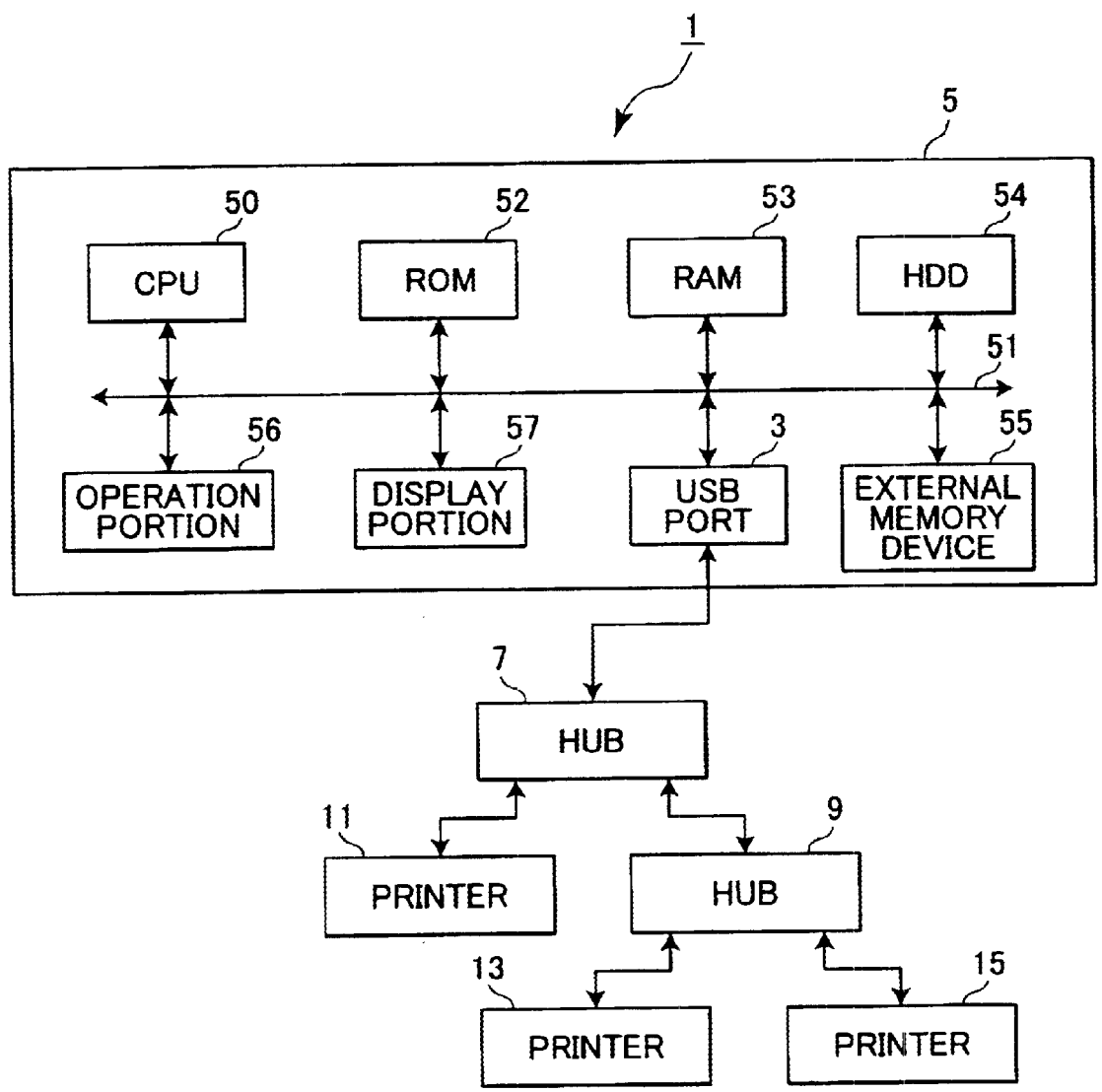
FIG. 1 is block view showing a hardware configuration of a printer system according to the embodiment of the present invention.

An image processing system according to a preferred embodiment of the present invention will be described while referring to the accompanying drawings wherein like parts and components are designated by the same reference numerals to avoid duplicating description.

As shown in FIG. 1, a printing system 1 according to the present embodiment includes a personal computer 5 provided with a USB port 3. Three USB compatible printers 11, 13, and 15 are connected to the USB port 3 of the personal computer 5 through hubs 7 and 9. Although not shown in the drawing, each printer includes a storage unit, such as an internal ROM, which stores therein distinction information that distinguishes the printer from other printers. Examples of such distinction information includes a printer name formed from a character train, or an ID code formed from a train of numbers. Each of the printers 11, 13 15 is designed to output this distinction information in response to a predetermined command outputted from, for example, the personal computer 5. Distinction information will be referanda to alternatively as "device ID" hereinafter.

Next, the configuration of the personal computer 5 will be described in more detail.

The personal computer 5 includes a CPU 50, a ROM 52, a RAM 53, a hard disk 54, an external memory or data recording medium 55 such as a floppy disk or a CD-ROM, an operation portion 56 such as a keyboard or a mouse, a display portion 57 such as a CRT (cathode ray tube), and the USB port 3, all connected together by a bus 51.

Figure 5:
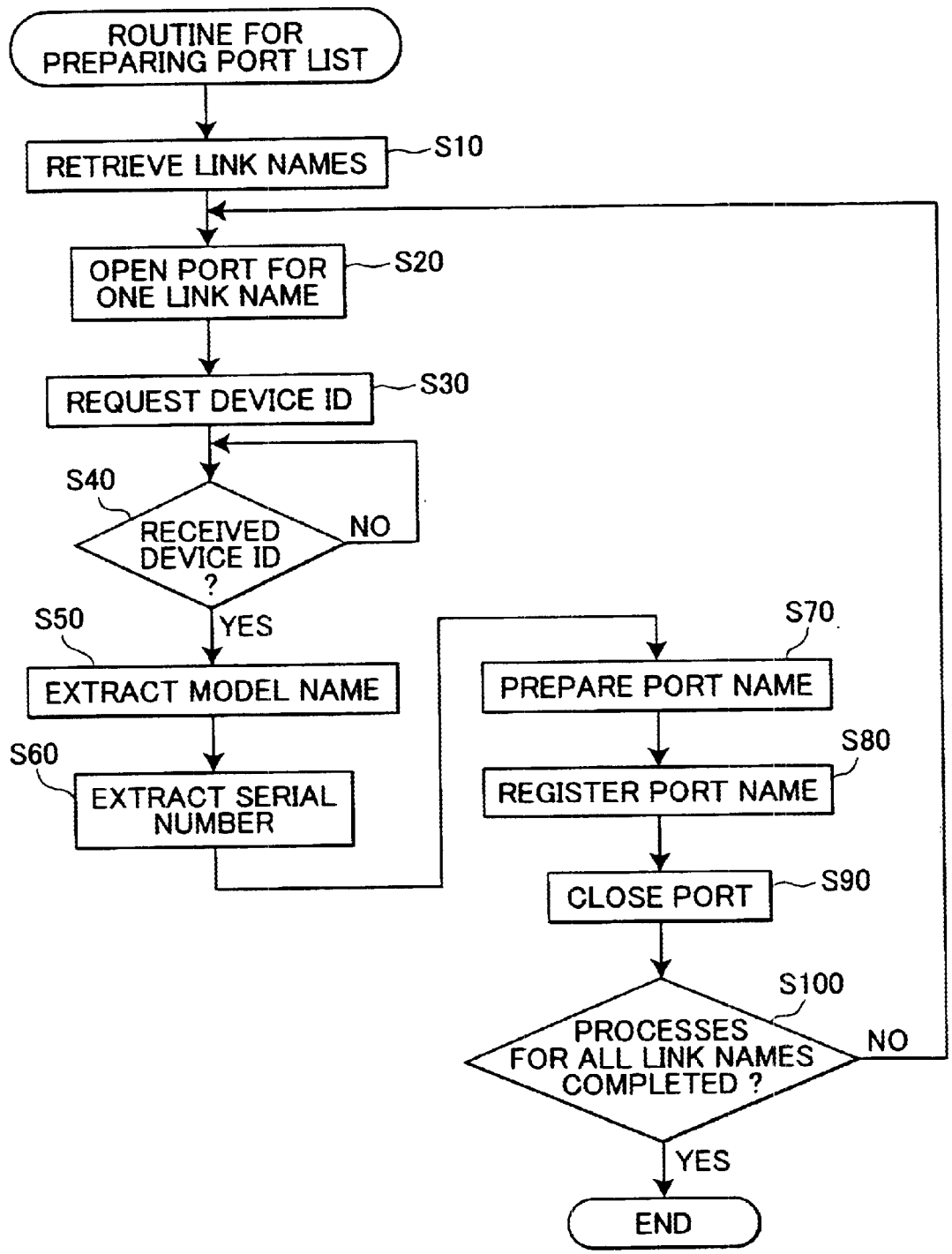
FIG. 5 is a flowchart representing a routine for preparing a port list.

The hard disk 54 stores therein operating system (basic software) 100, application software 120, a variety of driver software including printer driver 110 and USB driver 150, and printer system software 135 according to the present embodiment. The printer system software 135 is configured from a combination of a port monitor 130 and a printer class driver 140. The printer system software 135 is originally stored in the external memory 55 (floppy disk or CD-ROM), and is installed on the hard disk 54. The printer system software 135 is represented by the flowcharts of FIGS. 5 and 7. In the processes of FIGS. 5 and 7 in the printer system software 135, processes in S10, S20, and S60–S100 in FIG. 5 and processes in S210–S240 in FIG. 7 are provided by the port monitor 130, and processes of S30–S50 in FIG. 5 are provided by the printer class driver 140.

Figure 2:
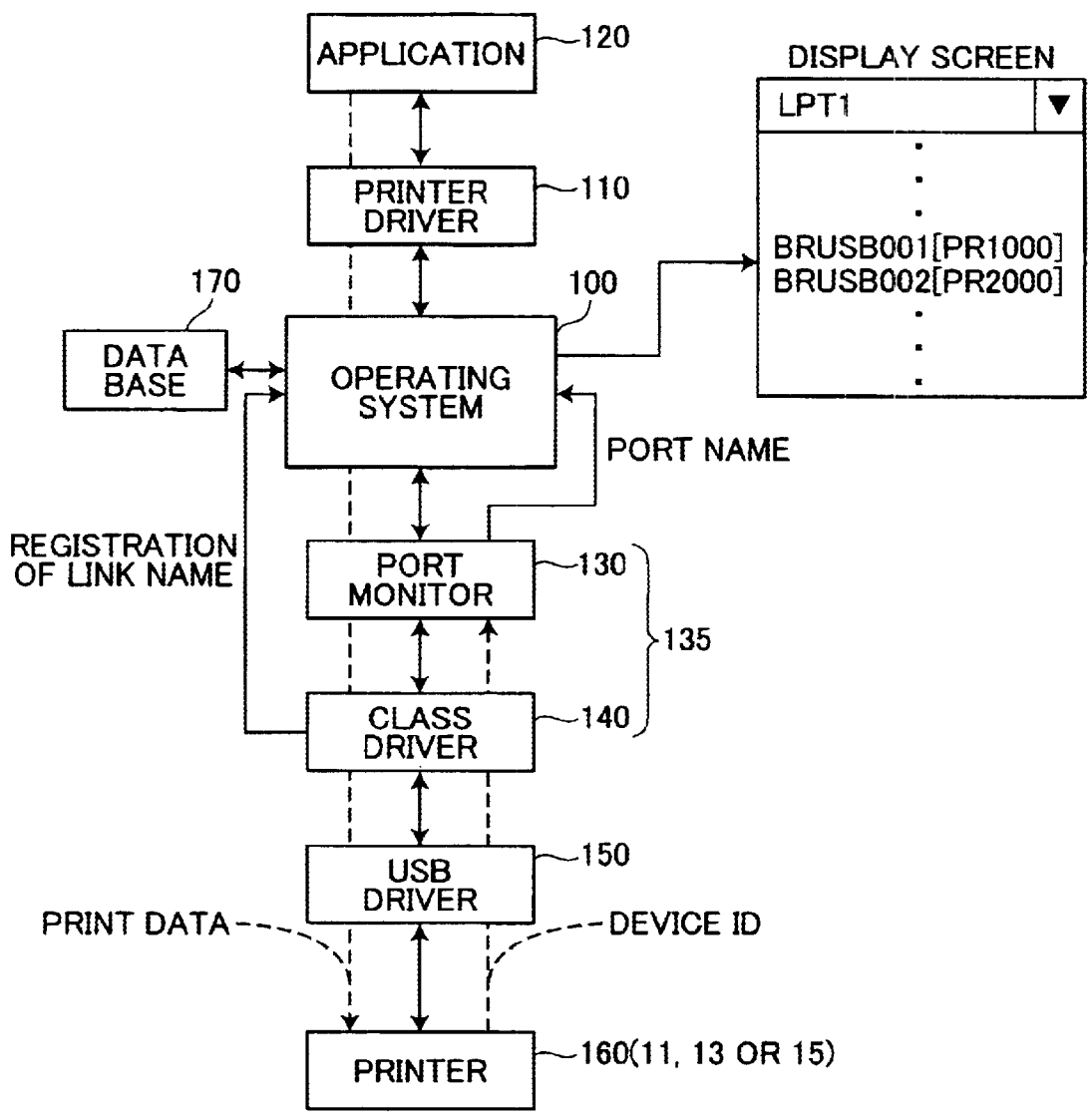
FIG. 2 is a schematic view representing a software configuration of the printer system of the embodiment.

During the operation of the computer 5, the above-described softwares are loaded hierarchically into the main memory, that is, the RAM 53. In the hierarchy, as shown in FIG. 2, the USB driver 150 is located nearest the USB device hardware 160 (11, 13, or 15) as shown in FIG. 2. The printer class driver 140 is incorporated in an upper class than the USB driver 150 in a manner that the printer class driver 140 can access the USB driver 150. The port monitor 130 is incorporated into the operating system 100. It is noted that the operating system 100 has port monitors other than the port monitor 130 for the USB port 3. For example, there are provided various port monitors, such as a port monitor that manages ports (logic ports) "LPT1", "LPT2", . . . for Centronics interface, another port monitor that manages other ports (logic ports) "COM1", "COM2", . . . for a RS232C or serial port, and the port monitor 130 that manages other ports (logic ports) "BRUSB001", "BRUSB002", . . . for the USB devices 11, 13, and 15. The application 120, which is for preparing data to be printed, is loaded onto the operating system 100. The printer driver 110, for converting data prepared by the application 120 into print data for printing, is also loaded onto the operating system 100.

A user can operate the operating system 100 and the application 120 using the keyboard and mouse of the operation portion 56 while viewing the CRT of the display 57.

Next, portions of the operating system 100 relating to the present embodiment will be described.

The operating system 100 has a function for listing names of ports (logic ports) that the printer can be connected with, thereby enabling the user to select one of the ports.

This port-listing function of the operating system 100 will be described below.

When the user performs operations to request the computer 5 to establish a correspondence or connection between the printer driver 110 and one port (logic port), the operating system 100 commands the port monitor 130 to list port names of all ports under management of the port monitor 130. Detailed operation of the port monitor 130 will be described later. Next, the operating system 100 drives the display portion 57 to display the port names listed by the port monitor 130 so that the user can select one of the port names from the list. When the user selects one of the port names using the keyboard or mouse 56, the operating system 100 establishes a connection between the printer driver 110 and the selected port, and then stores data indicative of the correspondence in the RAM 53 or the hard disk 54. When the user inputs a command to print based on data prepared by the application 120, the printer driver 110 converts the prepared data into print data usable by the printer 160. The operating system 100 then commands the port monitor 130 to output the print data to the port that corresponds to the printer driver 110. The port monitor 130 accesses the class driver 140 and sends the print data to the USB driver 150 that is subordinate to the printer class driver 140. The print data is then outputted through the USB port 3.

The operating system 100 has another function to prepare a data base 170 in the RAM 53 and the hard disk 54 and to register or store, in the data base 170, information on a connection pathway from the personal computer 5 to each of the connected USB devices 11, 13, and 15. The operating system 100 allocates a serial number to each set of connection pathway information, and manages the connection pathway information using this serial number.

Figure 3A:
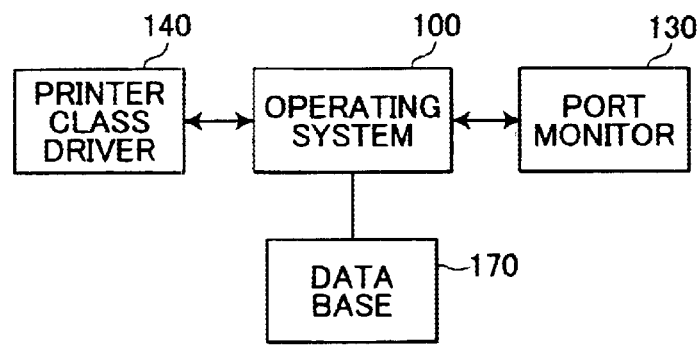
FIG. 3A is a schematic view representing connection relationship between a port monitor, an operating system, and a printer class driver of the embodiment.
Figure 3B:
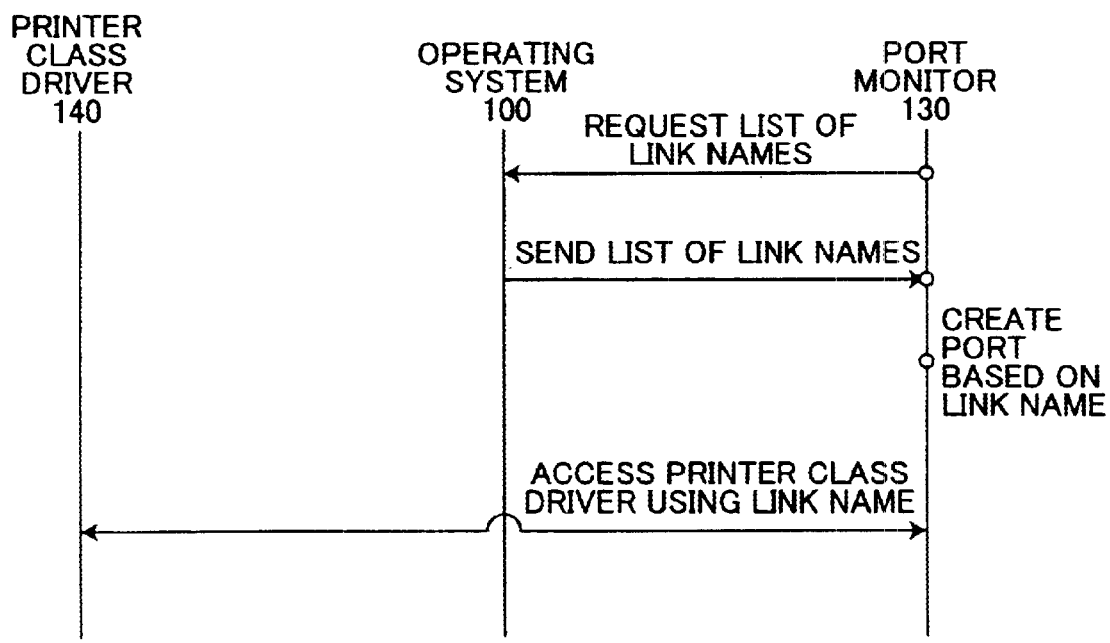
FIG. 3B is a schematic view representing communication relationship of the port monitor, the operating system, and the printer class driver.
Figures 3C, 4:
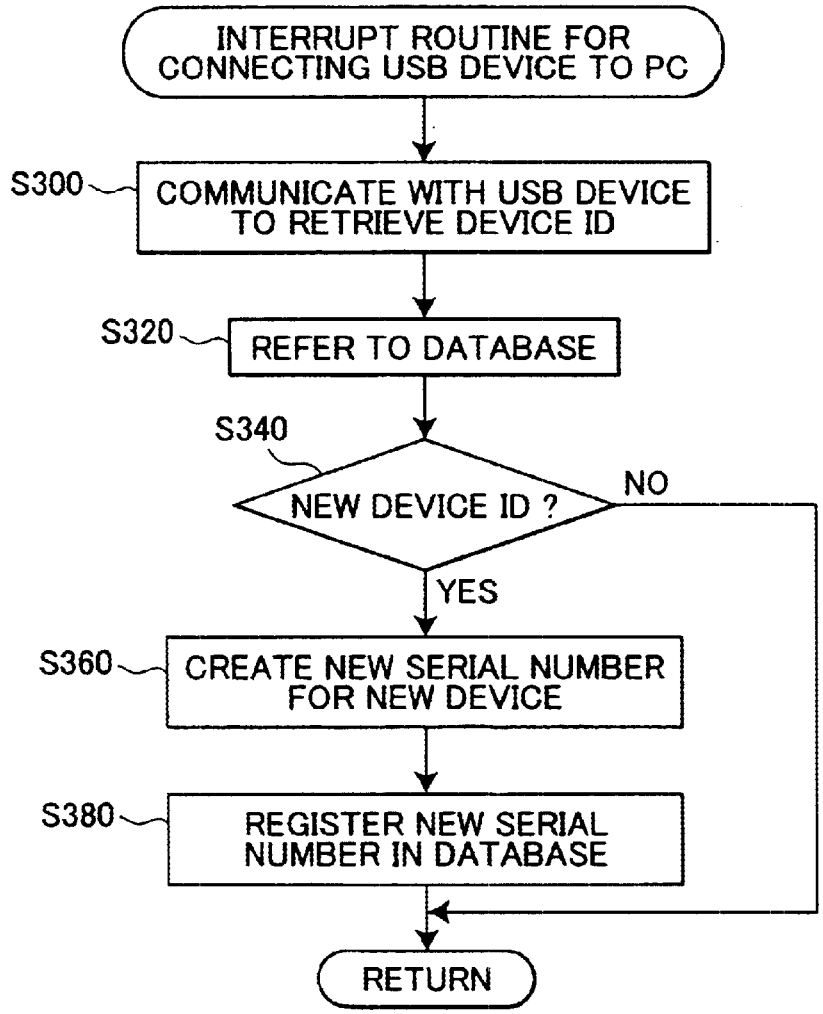
FIG. 3C is a schematic view illustrating a data base.
FIG. 4 is a flowchart representing an interrupt routine for connecting a USB device to a personal computer according to the embodiment.

In order to register the connection pathway information and the serial number into the data base 170, the operating system 100 executes an interrupt routine, represented by the flowchart in FIG. 4, each time a USB device (printer 11, 13, or 15, for example) is connected to the USB port 3. More specifically, a USB hardware circuit (not shown) in the personal computer 5 detects a voltage change which is induced at the USB port 3 when a USB device is connected to the USB port 3. Upon detection of the voltage change, the USB hardware circuit requests the operating system 100 to start the interrupt routine of FIG. 4. Thus, the voltage change acts as a trigger for the interrupt routine.

During the interrupt routine, first in S300, the CPU 50 performs a communication with the USB device to obtain distinction information (device ID) from the USB device. Then, in S320, the CPU 50 refers to the database 170 in order to determine whether or not the subject USB device is newly connected to the personal computer 5. If the USB device has previously been connected to the personal computer 5, and so is registered in the data base 170 in the hard disk 54 (No in S340), then this interrupt routine is ended. If the USB device is newly connected to the USB port 3 (Yes in S340), then in S360, the CPU 50 creates a new serial number. Then, in S380, the CPU 50 registers, in the database 170, the newly-created serial number in association with: a set of information on a connection pathway, along which the computer 5 is connected to the subject USB device, and another set of information on a type of the subject USB device.

It is noted that the CPU 50 creates different serial numbers for different USB devices so that the serial numbers can discriminate between the plural USB devices. In this example, the CPU 50 creates serial numbers "001", "002", . . . to respective USB devices. Thus, different serial numbers can simply indicate that the they relate to different USB devices that are different in their device types, that are different in their connection pathways, or that are different both in their device types and their connection pathways. The serial numbers cannot indicate any actual device type or any actual connection pathway for the USB devices.

It is further noted that the CPU 50 also creates in S360 a link name for the subject USB device. The CPU 50 creates a link name based on the serial number. The CPU 50 creates the link name so that the link name incorporates information that enables the printer class driver 140 to distinguish between different device types and different connection pathways. For example, the CPU 50 creates "BRUSB001", "BRUSB002", . . . , as the link names for respective USB devices. In S380, the CPU 50 registers the link name in association with the corresponding serial number and the corresponding information on the device type and on the connection pathway. As a result, the data base 170 is prepared in each of the hard disk 54 and the RAM 53 as shown in FIG. 3C. The data base 170 is prepared to register therein, for each USB device connected to the computer 5, a serial number, a link name, and data on the connection pathway and the USB device type. It is noted that a port name for each USB device will be created and registered during a port list preparing routine of FIG. 5 as will be described later.

After completion of registration in S380, the interrupt routine is ended.

In the above-description, the link name is created and registered simultaneously with creation and registration of the serial number. However, the link name may be created and registered based on the serial number when the operating system 100 is first started up.

The printer class driver 140 has a function, as shown in FIG. 3A, to refer to a link name of a desired USB printer, which is registered in the data base 170. Using the connection pathway information registered together with the link name, the printer class driver 140 and its subordinate USB driver 150 follow the corresponding connection pathway to the desired USB printer and access the desired USB printer. Thus, the USB driver 150 and the printer class driver 140 follow the desired connection pathway, using the information managed by the operating system 100 based on the serial number, thereby finally reaching the desired printer and sending print data to the selected printer. Thus, each printer, whose link name is registered during the processes of FIG. 4, is properly connected to the printer class driver 140 and the USB driver 150.

The port monitor 130 has a function to access the printer class driver 140 using a link name for each printer through performing the operations in a manner shown in FIG. 3B. That is, the port monitor 130 first requests the operating system 100 to supply the port monitor 130 with a list of the link names in the database 170. The operating system 100 sends the list to the port monitor 130. The port monitor 130 then creates a port (logic port) for each link name. The port monitor 130 will access the printer class driver 140 using the link name.

Hereinafter, a process of the port monitor 130 to select a desired printer based on a link name and then to enable transmission of command data and print data to the selected printer will be referred to as a process "for opening port." Another process to release the opened port condition and give the right to use the port to other processings will be referred to as a process "for closing port."

When the power of the computer 5 is turned ON, a port list is prepared in a manner described below.

As shown in FIG. 5, first in S10, the CPU 50 retrieves link names of all the devices in the system that are connected to the printer class driver 140 at that time. The CPU 50 performs this operation using functions of the operating system 100. Next, in S20, the port monitor 130 is executed to open one port according to one of the retrieved link names. Once the port is opened, then in S30, the CPU 50 sends a command to a printer that corresponds to the present link name, requesting that the printer transmit its device ID to the computer 5.

It is noted that the CPU 50 can request transmission of the device ID using either a USB printer class command or a printer job management language. A USB printer class command is a command that depends upon the USB interface device. Printer job management language depends on data communicated with printers. According to the present embodiment, the CPU 50 requests transmission of each device ID using a USB printer class command. All printers that are USB compatible are capable of receiving and understanding USB printer class commands, so that USB printer class commands can be used even for printers that do not include job management language. Also, because USB printer class commands are transmitted using a different transfer format than print data, USB printer class commands can be transmitted even while print data is being transmitted.

The following character train is an example of a device ID: "MFG: ABC; CMD; PCL5, PJL, PCLXL; MDL: PR1000 series; CLS: PRINTER;" wherein "MFG" represents the manufacturer's name, "CMD" represents the type of command system that can be processed, "MDL" represents the model name, and "CLS" represents the type of device. In this example, the "PR1000", which appears after "MDL;" represents the printer's model name and is a name for distinguishing the printer from other printers.

When the printer transmits its device ID (S40: YES), then in S50 the CPU 50 executes processes to extract the model name from the device ID. In S60, the CPU 50 executes processes to retrieve the serial number from the present link name. Next, in S70, the CPU 50 creates a port name that is used for display purposes. The CPU 50 creates the port name so that the port name includes the serial number and the model name that have been extracted in S60 and S50. Accordingly, each port name is prepared in correspondence with both of a link name and a device model name. An example of a port name is BRUSB001[PR1000].

Next, the port name prepared in S70 is registered in the data base 170 in S80 as shown in FIG. 3C and the port that has been processed in the series of operations of S20–S80 is closed in S90.

Then in S100, the CPU 50 judges whether or not the above-described processes have been executed for all the link names retrieved in S10, that is, for all link names having a connection with the printer class driver 140. When the above-described processes have not yet been performed for all link names (S100:NO), then the processes from S20 and on are performed for each subsequent link name, until the above-described processes have been completed for all the link names retrieved in S10 (S100:YES), whereupon this routine is ended.

Thus, during the above-described processes, the link names of all the USB devices, that are connected to the system at that time, are first retrieved, and a port is opened for one of the link names (S10, S20). Then, a command requesting a printer, that is connected to the subject port, to transmit device ID is issued, and a model name is extracted from device ID that is received in response to the command (S30–S50). Then, a serial number is retrieved from the subject link name (S60). Than, a port name, such as "BRUSB001[PR1000]", is created to include both the serial number and the model name (S70). The created port name is registered in S80, and the subject port that has been processed in S20–S80 is closed (S90).

With these processes, a port name is prepared for each printer 11, 13, 15 that is connected to the USB port 3. The port names are then stored in the data base 170 (RAM 53 and the hard disk 54) and registered under the control management by the port monitor 130 as shown in FIG. 3B. The port names each includes a model name and a serial number that corresponds to the connection pathway with the corresponding printer.

The operating system 100 has another function for setting printer properties. This function is used to establish a connection or correspondence between the printer driver 110 and one port (logic port) with a desired port name. When the user performs operations onto the operation portion 56 to request settings of printer properties, the operating system 100 starts a routine, represented by the flowchart in FIG. 6, to display various printer properties.

Figure 6:
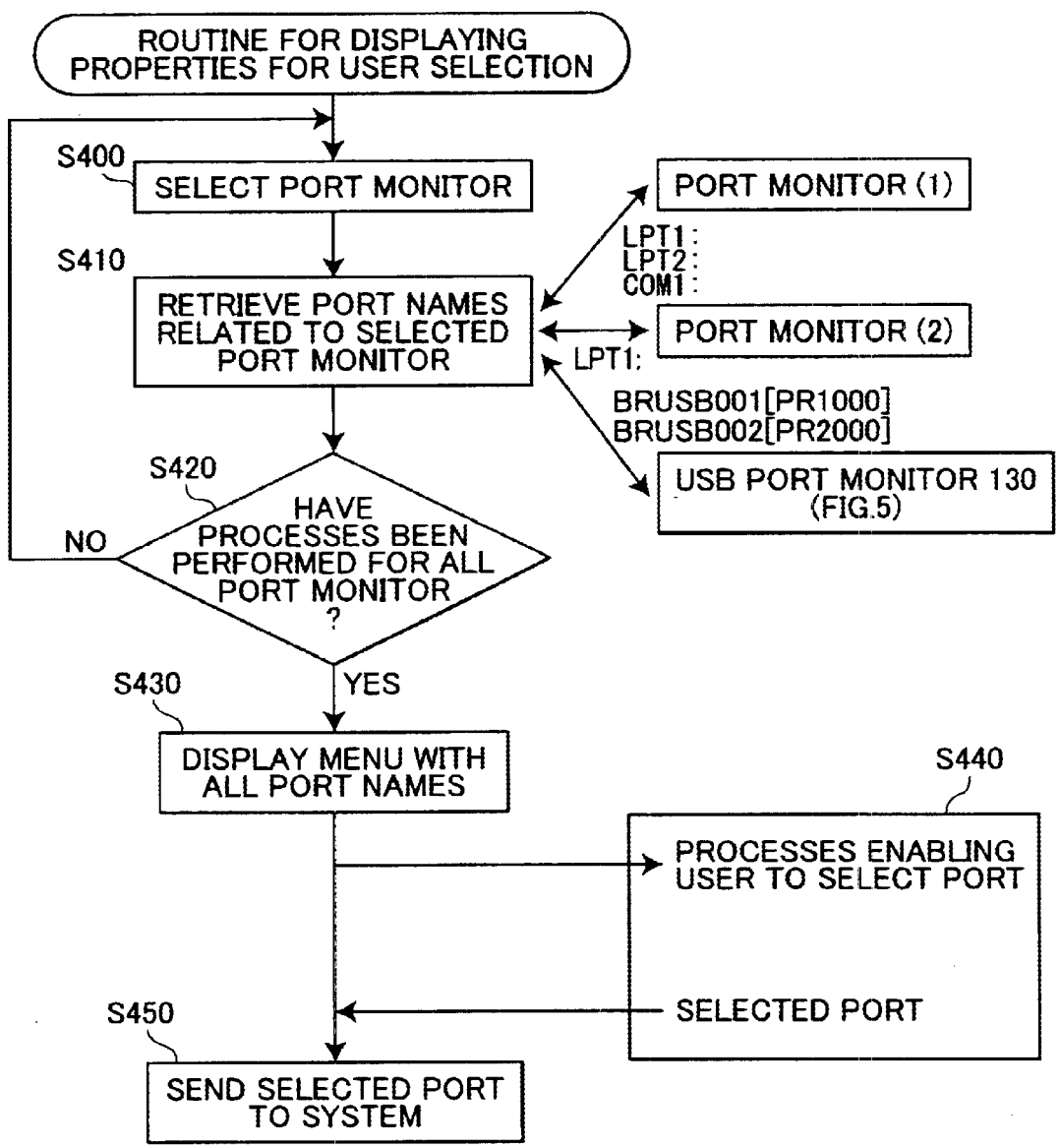
FIG. 6 is a flowchart representing a routine for displaying properties for user selection.

During the printer properties setting routine, first, in S400, the CPU 50 selects, according to the operating system 100, one port monitor as the target of further processes. Then in S410, the operating system 100 requests the selected port monitor to provide a list of port names. When a port monitor other than the port monitor 130 for the USB port 3 is the target of processes, the operating system 100 requests that port monitor (port monitor (1) or (2) in FIG. 6) to provide a list of corresponding port names. When the port monitor 130 for the USB port 3 is the target of processes, then the port monitor 130 responds to this request by first performing the port list preparing processes of S10 to S100 in the flowchart of FIG. 5. As a result, the same registration operations are performed for any printer that is connected to the personal computer 5 after the personal computer 5 has been started up and is running. Using this method, port names are produced either when the operation system 100 is first started up or when the printer settings (property) screen of FIG. 6 is started up. In response to the request from the operating system 100, the port monitor 130 provides the newly-created port list to the operating system 100. When port lists for all the port monitors are received (yes in S420), the program proceeds to S430.

In S430, the operating system 100 displays all of the port names on a pull down menu of the display portion 57 as shown in FIG. 2. For example, port names, such as "BRUSB001[PR1000]", "BRUSB002[PR2000]", . . . , are displayed on the display portion 57. In this example, the number "001" of "BRUSB001" and the number "002" of "BRUSB002" are serial numbers that correspond to link names, and the character trains [PR1000] and [PR2000] in brackets are model names of different printers. In S440, the user looks at the pull down menu on the display 57 and finds the bracketed model name of the printer he or she wishes to print with. When the user selects that printer model name, a corresponding port is selected and the selected port is sent back to the system operations in S450. Thus, the operating system 100 establishes a connection between the selected port and the printer driver 110 of the corresponding printer.

It is noted that in the conventional system with a plurality of printers connected to a computer, no printer information is appended to port names. Therefore, the user can easily mistake which port name is for the desired printer, and so can easily select the wrong port name. As a result, the wrong printer will be erroneously connected to the printer driver.

However, according to the system of the present embodiment, a printer name is appended to each port name. Therefore, the user can easily select the correct port name, so that printers and ports will always be correctly connected together.

When the user desires to print data using the application 120, the application 120 and the printer driver 110 cooperate with each other to prepare print data. The operating system 100 sends the prepared print data to a port monitor that manages a port that is now connected to the printer driver 110 by the printer property setting processes of FIG. 6. For example, when the user desires to print data with a USB printer he/she has selected during the property setting routine of FIG. 6, the operating system 100 sends the prepared print data to the port monitor 130 which manages a port that is now connected to the printer driver 110 by the printer property setting processes of FIG. 6. The port monitor 130 then performs printing starting processes of FIG. 7.

During the printing starting processes, as shown in FIG. 7, first, in S210, the CPU 50 retrieves the serial number from the selected printer port name. Next, in S220 the CPU 50 retrieves, from the data base 170, link names for all printers connected to the printer class driver 140 at that time. In S230, the CPU 50 searches for one link name that matches the serial number of the selected port name. The CPU 50 determines a port that is connected to the selected printer based on the link name that matches the serial number. In S240, the CPU 50 opens the port that is determined as being connected to the selected printer. Afterwards, print data is outputted and then printing is performed using the printer selected by the user. The port is closed after printing has been completed for all print data.

As described above, the operating system 100 first establishes connection or correspondence between the plurality of printers and a plurality of ports, and registers link names in association with serial numbers for the plural printers. Thus, the operating system 100 stores information on a connection pathway, along which the computer is connected to each printer. In S30, the CPU 50 requests each printer to transmit its device ID to the computer. In S50, the CPU 50 extracts the model name from the received device ID. In S60–S80, the CPU 50 creates a character string discriminating each printer from other printers, and creates and registers a port name for each printer. When a user operates the operating system to display printer properties, the CPU 50 executes the processes of S400–S420 to request the port monitor 130 to list up all the port names, and executes the processes of S430 to display the port names in the display 57. The operating system 100 requests the port monitor 130 to transmit print data via the user's designated port. The port monitor 130 executes the printing starting processes of S210–S240 in order to execute transmission of print data to the desired printer. Thus, the port monitor 130 manages the plurality of logic ports for the plurality of printers by: requesting each printer to transmit device ID in S30, creating a character string based on the received device ID in S50, creating a port name based on the character string in S70, and listing up the port names for the printers in 410 in response to the request from the operating system 100. When the user wishes to use a particular one of printers 11, 13, 15 connected to the USB port 3, the printer system of the present embodiment enables the user to confirm the model name of the printer that will be used for printing, by referring to the port name on the displayed list. As a result, the user can easily select a desired printer so that printing is performed using the desired printer.

While the invention has been described in detail with reference to the specific embodiment thereof, it would be apparent to those skilled in the art that various changes and modifications may be made therein without departing from the spirit of the invention.

For example, the present invention can be applied with equally good effects to a retrieval system, wherein a plurality of USB compatible image scanners, not printers, are connected to a single USB computer. In this case, the operating system requests reception, via a selected port, of image data that is retrieved by an image scanner that is connected to the selected port. Thus, the operating system receives image data so that the image data will be used by an application. The present invention can be alternatively applied to a system with a plurality of image processors, such as facsimile devices or multifunction devices each having a printing function and an image scanning function, connected to the same computer. In those systems wherein the plurality of image processors are connected to the single computer, a user can easily distinguish the image processors from one another and can easily select one of the image processors to perform image processes.

In the above description, the image processing system is comprised from a computer and a plurality of image processing devices, such as printers or scanners, connected to the computer. However, the present invention can be applied to a system, in which at least one image processing device, such as a printer or a scanner, is connectable to a computer.

What is claimed is:

1. An image processing system, comprising:
   at least one image processing device; and
   a computer connected to the at least one image processing device, the computer including:
   a storage unit storing a connection path information identifying a path, along which each image processing device is connected to the computer;
   a request unit requesting each image processing device to transmit, to the computer, information including a distinction name discriminating between the at least on image processing device;
   a name extracting unit analyzing the information transmitted from each image processing device to extract the distinction name from the information;
   a registration unit creating, for each image processing device, a port name including a combination of the extracted distinction name and the path information stored in the storage unit, the registration unit registering the created port name for each image processing device; and
   a display unit displaying the port names for the at least one image processing device based on the contents registered by the registration unit, thereby enabling a user to view the port name of the at least one image processing device to select a desired image processing device among the at least one image processing device, the selected image processing device executing a desired image processing operation.

2. An image processing system applied to a computer, connected to at least one image processing device, the computer being installed with a basic software for providing:
   storage means for storing information on a path along which each image processing device is connected to the computer;
   display means capable of displaying a port name connectable to each image processing device;
   list request means for requesting a port management means to list up all of at least one port name managed by the port management means; and
   data request means for designating one port name among the at least one port name listed up by the display means and for requesting either one of transmission and reception of data via the designated port,
   the image processing system including the port management means for managing at least one port for the at least one image processing device, the port management means including:

information request means for requesting each image processing device to transmit, to the computer, information including distinction name discriminating the each image processing device from other image processing device, character string creating means for creating a character string discriminating the each image processing device from other image processing device based on the information transmitted from each image processing device;

port name creating means for creating, for each image processing device, a port name that includes the created character string; and a port name list up means for controlling the display means to list up the port name for the at least one image processing device in response to the request by the list request means provided by the basic software.

3. An image processing system as claimed in claim 2, wherein the character string creating means creates a character string that indicates one path information stored in the storage means provided by the basic software.

4. An image processing system as claimed in claim 3, wherein the character string creating means includes extracting means for creating the character string by extracting the distinction name from the information that is transmitted from each image processing device in response to the request.

5. An image processing system as claimed in claim 4, wherein the computer is provided with a universal serial bus, each image processing device being connected to the universal serial bus via a hub.

6. A data recording medium recording a program so as to be readable by a computer connectable to at least one image processing devices, the computer being installed with a basic software for providing:

storage means for storing information on a path, along which each image processing device is connected to the computer;

display means capable of displaying a port name connectable to each image processing device;

list request means for requesting port management means to list up all of at least one port name managed by the port management means; and data request means for designating one port name among the at least one port name listed up by the display means and for requesting either one of transmission and reception of data via the designated port, the program providing the port management means for managing at least one port for the at least one image processing device, the program including:

a program requesting each image processing device to transmit, to the computer, information including distinction name discriminating the each image processing device from other image processing device;

a program creating a character string discriminating the each image processing device from other image processing device based on the information transmitted from each image processing device;

a program creating, for each image processing device, a port name that includes the created character string; and a program controlling the display means to list up the at least one port name for the at least one image processing device in response to the request by the list request means provided by the basic software.

7. An image processing system, comprising:

a plurality of image processing devices; and a computer connected to the plurality of image processing devices, the computer including:

a storage unit storing a connection path information identifying a path, along which each image processing device is connected to the computer;

a request unit requesting each image processing device to transmit, to the computer, information including a distinction name discriminating between the plurality of image processing devices;

a name extracting unit analyzing the information transmitted from each image processing device to extract the distinction name from the information;

a registration unit creating, for each image processing device, a port name including a combination of the extracted distinction name and the path information stored in the storage unit, the registration unit registering the created port names for the plurality of image processing devices; and a display unit displaying the port names for the plurality of image processing devices based on the contents registered by the registration unit, thereby enabling a user to view the port names of the plurality of image processing devices to select a desired image processing device among the plurality of image processing devices, the selected image processing device executing a desired image processing operation.

8. An image processing system applied to a computer, connected to a plurality of image processing devices, the computer being installed with a basic software for providing:

storage means for storing information on a path, along which each image processing device is connected to the computer;

display means capable of displaying a port name connectable to each image processing device;

list request means for requesting a port management means to list up all of a plurality of port names managed by the port management means; and data request means for designating one port name among the plurality of port names listed up by the display means and the requesting either one of transmission and reception of data via the designated port, the image processing system including the port management means for managing a plurality of ports for the plurality of image processing devices, the port management means including:

information request means for requesting each image processing device to transmit, to the computer, information including distinction name discriminating the each image processing device from other image processing devices;

character string creating means for creating a character string discriminating the each image processing device from other image processing device based on the information transmitted from each image processing device;

port name creating means for creating, for each image processing device, a port name that includes the created character string; and a port name list up means for controlling the display means to list up the port names for the plurality of image processing devices in response to the request by the list request means provided by the basic software.

9. A data recording medium recording a program so as to be readable by a computer connectable to a plurality of image processing devices, the computer being installed with a basic software for providing:

storage means for storing information on a path, along which each image processing device is connected to the computer;

display means capable of displaying a port name connectable to each image processing device;

list request means for requesting port management means to list up all of a plurality of port names managed by the port management means; and data request means for designating one port name among the plurality of port names listed up by the display means and for requesting either one of transmission and reception of data via the designated port, the program providing the port management means for managing a plurality of ports for the plurality of image processing devices, the program including:

a program requesting each image processing device to transmit, to the computer, information including distinction name discriminating the each image processing device from other image processing device;

a program creating a character string discriminating the each image processing device from other image processing device based on the information transmitted from each image processing device;

a program creating, for each image processing device, a port name that includes the created character string; and a program controlling the display means to list up the port names for the plurality of image processing devices in response to the request by the list request means provided by the basic software.

* * * * *